United States Patent Office 3,118,923
Patented Jan. 21, 1964

3,118,923
PROCESS FOR PREPARING FLUORINATED
ORGANIC ISOCYANATES
Frank S. Fawcett, Robert D. Lipscomb, and William
Channing Smith, Wilmington, Del., assignors to E. I.
du Pont de Nemours and Company, Wilmington, Del.,
a corporation of Delaware
No Drawing. Filed July 26, 1960, Ser. No. 45,306
15 Claims. (Cl. 260—453)

This invention is concerned with a process for preparing fluorinated organic compounds. More particularly, the invention is directed to a process for obtaining fluorinated organic isocyanates.

Polyfluorinated organic isocyanates are a useful class of organic compounds which have an interesting combination of chemical and physical properties. They are valuable as intermediates in the preparation of fluorinated amides, fluorinated carbamic acid esters, and fluorinated acids. The perfluorocarbon isocyanates, in particular, have a unique combination of physical and chemical properties which makes them valuable as laundry-fast water-repellent finishes for cellulosic fabrics and as intermediates in the preparation of compounds bearing perfluorocarbon chains (see, e.g., U.S. 2,617,817 and U.S. 2,625,561).

Full realization of the uses for polyfluorinated organic isocyanates is hampered by the lack of a satisfactory method for obtaining the compounds. The principal method used in the past employs alkali metal azides as one reactant and this method, therefore, requires adequate precautions against explosion hazards. A practical process for obtaining polyfluorinated organic isocyanates is a desirable goal.

The invention may be defined as the process of preparing polyfluorinated organic isocyanates by reacting carbonyl difluoride with at least one compound of the formula (1) $A(CN)_n$ where A is M, a halogen (chlorine, fluorine, bromine and iodine), —OH, —$[(O)_n—M]$, —$[(S)_n—M]$, or an aliphatically saturated organic group which may be hydrocarbon or fluorohydrocarbon (including perfluorohydrocarbon) of 1–11 carbons, M is an alkali metal or an alkaline earth metal, and $n$ (in the above definition) is an integer equal to the valence of the moiety A which can range from 1 to 4.

The important classes of compounds reacted with carbonyl difluoride according to the process of this invention are alkali metal and alkaline earth metal cyanides, cyanogen halides, certain inorganic cyanates and thiocyanates, hydrocarbyl nitriles, and polyfluorohydrocarbyl nitriles.

In the above compounds and generic formula, it is recognized that cyanates and thiocyanates are sometimes considered to exist in isomeric forms and it is intended that the various isomeric forms shall be included within the scope of the formula.

Trifluoromethyl isocyanate ($CF_3NCO$) is obtained as the principal product when metal cyanides, cyanogen halides, inorganic cyanates and inorganic thiocyanates are employed as the nitrogen-bearing reactants. Polyfluorinated organic isocyanates having one or more carbons in the organic group are obtained by using an organic nitrile as defined above.

Metal cyanides of Formula 1 which are operable in the process have the general formula $M(CN)_n$, where M is an alkali metal or an alkaline earth metal, the value of $n$ in these instances being 1 and 2, respectively.

Cyanogen halides of Formula 1 which can be employed in the process have the general formula XCN, where X is a halogen (F, Cl, Br, and I). The preferred compounds in this group are the fluoride and chloride.

Inorganic cyanates and inorganic thiocyanates of Formula 1 which are operable in the process can be represented by the following subgeneric formula:

(2) $M'(YCN)_n$ where M' is hydrogen, an alkali metal or an alkaline earth metal, $n$ is the valence of M' and Y is oxygen or sulfur, with the proviso that Y is oxygen when M' is hydrogen.

Organic nitriles which can be employed in the process are those of formula (3) $R(CN)_n$ where R is an aliphatically saturated hydrocarbon group or aliphatically saturated fluorohydrocarbon group (including perfluorohydrocarbon) of 1–11 carbons, and $n$ is as defined under Formula 1. By the term "aliphatically saturated," it is meant that the groups are free of olefinic and acetylenic unsaturation, i.e., non-benzenoid unsaturation. In a preferred group of reactants, R in Formula 3 is a polyfluorinated organic group consisting of carbon, fluorine and at most one hydrogen which, if present, is on the terminal or ω-carbon. This preferred group of compounds is represented by the formula (4) $Z(CF_2)_nCN$ where Z is hydrogen or fluorine and $n$ is a whole positive number of up to 11, i.e., $n$ has a value of 1–11, inclusive.

The nitrogen-bearing reactants are in many cases commercially available materials. Examples of alkali and alkaline earth metal cyanides, cyanates and thiocyanates which can be used are the compounds of sodium, potassium, lithium, cesium, barium, strontium and calcium. In the operation of the process employing metal cyanides, cyanates and thiocyanates the metal does not appear in the final product and the metal component is, therefore, not a critical feature of this group of reactants.

Cyanic acid can be employed in the reaction most conveniently in the form of a precursor, cyanuric acid. The precursor decomposes under the conditions of the reaction to provide the cyanic acid.

Cyanogen halides are well-known compounds which are available commercially or which can be prepared by well-known methods. Precursors of the cyanogen halides can be employed, i.e., the cyanuric halides, by conducting the process under conditions wherein the cyanuric halides decompose to form the cyanogen halides. The halogen other than fluorine in the cyanogen halides does not appear in the final isocyanate product. Cyanogen chloride (or cyanuric chloride) and cyanogen fluoride are readily prepared and these compounds form a preferred group of cyanogen halides.

Hydrocarbyl nitriles are well-known compounds of ready availability. Examples of this group of nitriles which may be employed in the reaction with carbonyl difluoride are acetonitrile, propionitrile, capronitrile, decanenitrile, isobutyronitrile, pivalonitrile, malonodinitrile, adipodinitrile, sebacodinitrile, benzonitrile, phthalodinitrile and terephthalodinitrile.

The polyfluorinated nitriles employed as one group of reactants are obtained by methods described in the literature, e.g., see Lovelace, Rausch and Postelnek, "Aliphatic Fluorine Compounds," pp. 265–266, Reinhold Publishing Corp., New York (1958). Examples of operable polyfluorinated organic nitriles are difluoroacetonitrile, trifluoroacetonitrile, perfluoropropionitrile, perfluorobutyronitrile, perfluorocapronitrile, perfluorodecanenitrile, ω-hydroperfluoropropionitrile, ω-hydroperfluoropentanenitrile, ω-hydroperfluoroheptanenitrile, ω-hydroperfluorononanenitrile, perfluorododecanenitrile, perfluoroadipodinitrile, and perfluorosuccinodinitrile.

Carbonyl difluoride can be prepared by methods described in the literature [see, for example, Ruff and Miltschitzky, Z. anorg. Chem. 221, 154 (1934). Emeleus and Wood, J. Chem. Soc. 1948, 2185, U.S. 2,836,622].

Commercial grades of the nitrogen-bearing reactants may be used. However, since carbonyl difluoride reacts instantaneously with water, it is important that the nitrogen-bearing reactants are substantially anhydrous in order to avoid wastage of carbonyl difluoride. Thus, solid reactants such as metal cyanides, cyanates and thiocyanates not only should be free of surface wetness, i.e., they should be free-flowing, but also they should be free of water of hydration. Liquid or gaseous organic nitrile reactants should be equivalent in dryness to materials dried with standard drying agents such as anhydrous calcium sulfate or magnesium sulfate. In the process of this invention, the presence of carbonyl difluoride assures completely anhydrous conditions in either the batch or continuous type of operation. In either process, the reaction chamber is preferably made of material resistant to chemical attack by hydrogen fluoride, e.g., copper, nickel, platinum, a nickel-iron-molybdenum alloy, and the like.

The ratio in which the reactants are employed is not critical. Thus, the molar ratio of the nitrogen-bearing reactant to carbonyl difluoride may be as low as 0.1 and as high at 10.0. The preferred molar ratio of multiply-bonded nitrogen reactant to carbonyl difluoride lies between about 0.25 and 4.0. Exact control of the molar ratios is not necessary in the process since unreacted materials can be recovered and used again.

The temperature at which the reaction is operated is determined by the process employed, i.e., whether batch or continuous, and by the nitrogen-bearing reactant. In a batch process which permits a long contact period between the reactants, reaction can be effected at relatively low temperatures. The reaction rate at these temperatures, however, is slow and it is preferred to conduct the process at a temperature of at least 200° C. The maximum temperature at which the process is operable is limited only by the decomposition temperature of the reactants. Temperatures as high as 1200° C. or higher can be employed, particularly in continuous flow processes with short contact times. In general, the temperature which is employed lies between 200 and 1200° C.; preferably the temperature lies between 225 and 1000° C.

Heating of the reactants to the desired temperature may be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability, and the reactants may, if desired, be heated in one step to the reaction temperature. For a batch process the reaction time is between about 2 hours and about 48 hours; for a continuous process the reaction time is quite short and it will be on the order of minutes, seconds, or fractions of seconds.

Catalysts may be employed in the reaction of carbonyl difluoride with cyanogen halides and with polyfluorinated nitriles, though the use of catalysts is not required. A catalyst is needed for practical results in the case of hydrocarbyl nitriles. Materials which are effective as catalysts in these reactions include the alkali metal fluorides (e.g., sodium fluoride, potassium fluoride and cesium fluoride) and hydrogen fluoride. When the nitrogen-containing reactant is a metal cyanide, cyanate or thiocyanate, the metal fluoride is formed in the reaction and an added catalyst is unnecessary. When hydrogen fluoride is employed as a catalyst, it may react with the isocyanate product to form an adduct characterized by the group

(cf., Buckley, Piggot and Welch, J. Chem. Soc. 1945, 864).

Isolation and purification of the product of the reaction is accomplished by well-recognized procedures such as liquefaction or condensation at low temperature, and fractional distillation. The product is usually a normally gaseous or a normally liquid material, depending upon the starting material, and it is generally purified by fractional distillation.

The operation of the invention is illustrated in the following examples, in which quantities of reactants (parts) are given in terms of weight.

*Example I*

A pressure vessel (capacity, 145 parts of water), whose inner surface is corrosion-resistant, is charged with 9.8 parts of sodium cyanide and 54 parts of carbonyl difluoride. The reactants are heated under autogenous pressure at 100° for 1 hour, 150° C. for 1 hour, 200° C. for 2 hours and 250° C. for 10 hours. The vessel is cooled to atmospheric temperature and volatile reaction products are collected in a cylinder cooled in liquid nitrogen. There is obtained 50 parts of volatile material which is shown by mass spectrometric analysis to contain trifluoromethyl isocyanate.

*Example II*

A pressure vessel (capacity, 145 parts of water), lined with a corrosion-resistant material, is charged with 31.8 parts of cyanogen bromide and 33 parts of carbonyl difluoride. The reaction mixture is heated under autogenous pressure at 100° C. for 2 hours, at 200° C. for 4 hours and 300° C. for 8 hours. The vessel is cooled to atmospheric temperature and volatile reaction products are collected in a cylinder cooled in liquid nitrogen. There is obtained 34 parts of volatile material which is shown by mass spectrometric analysis to contain about 10 mole percent of trifluoromethyl isocyanate.

*Example III*

A graphite tube (¾ I.D.) which is enclosed in an alumina shield, is packed for a length of 6" with 4–8" mesh carbon granules. The tube is connected at one end to a supply of carbonyl difluoride and of cyanogen fluoride; it is connected at the other end to a trap cooled with liquid nitrogen. The tube is heated to 552–554° C. and (over a period of 1 hour) there is passed simultaneously into the tube a total of 5 parts of carbonyl difluoride and 4 parts of cyanogen fluoride. A total of 8 parts of volatile product is collected in the nitrogen-cooled trap. Infrared spectrographic analysis shows that the product contains trifluoromethyl isocyanate.

*Example IV*

(A) A pressure vessel (capacity, 240 parts of water), whose inner surface is corrosion-resistant, is charged with 20 parts of trifluoroacetonitrile, 30 parts of carbonyl difluoride and 2.2 parts of cesium fluoride. The reaction mixture is heated under autogenous pressure for 2 hours at 200° C., 2 hours at 250° C. and 10 hours at 300° C. The vessel is cooled to atmospheric temperature and volatile reaction products are collected in a receiver cooled in liquid nitrogen. There is obtained 38 parts of material which is distilled through a fractionating column to yield 6 parts of a colorless material, B.P. −4 to +2° C. The condensed product is a colorless liquid which is pentafluoroethyl isocyanate, $CF_3CF_2NCO$. The identity of the product is confirmed by the nuclear magnetic resonance and infrared spectra.

(B) The process of Part A is repeated employing 30 parts of trifluoroacetonitrile, 45 parts of carbonyl difluoride and 1.5 parts of cesium fluoride. The mixture is heated for 10 hours at 350° C. There is obtained 64 parts of volatile products from which 13 parts of pentafluoroethyl isocyanate, boiling at −6 to −3° C., is separated by fractional distillation and is identified by analytical and infrared data.

*Analysis.*—Calc'd for $C_3F_5ON$: F, 58.99; Mol. Wt. 161. Found: F, 58.98; Mol. Wt., 160.

Example V

A pressure vessel (capacity, 240 parts of water) is charged with 30 parts of heptafluorobutyronitrile, 30 parts of carbonyl difluoride and 2.38 parts of cesium fluoride. The mixture is heated under autogenous pressure at 300° C. for 3 hours and 350° C. for 12 hours. There is obtained 56 parts of volatile products which are fractionated carefully to yield 0.3 part of liquid boiling at about 0° C., and 1.0 part of undistilled water-white residue. The residue is identified by its nmr spectrum as nonafluorobutyl isocyanate.

Example VI

A pressure vessel (capacity, 145 parts of water), lined with a corrosion-resistant material, is charged with 16.2 parts of potassium cyanate and 54 parts of carbonyl difluoride. The reaction mixture is heated at 100° C. for 2 hours, 150° C. for 2 hours, 200° C. for 4 hours and 250° C. for 4 hours. The vessel is cooled to atmospheric temperature and volatile products are collected in a trap cooled with liquid nitrogen. There is obtained 39 parts of product which is shown by mass spectrometric analysis to contain 14 mole percent of trifluoromethyl isocyanate.

Example VII

A pressure vessel lined with a corrosion-resistant material is charged with 97.2 parts of potassium thiocyanate and 132 parts of carbonyl difluoride. The reaction mixture is heated under autogenous pressure at 100° C. for 1 hour, 200° C. for 2 hours and 300° C. for 10 hours. The vessel is cooled to atmospheric temperature and volatile products are collected in a trap cooled in liquid nitrogen. There is obtained 132 parts of products which are allowed to warm slowly to −45° C., and products which are volatile up to this temperature are separated. There remains 88 parts of product which is distilled through an efficient low temperature fractionation column to yield 18 parts of liquid boiling at −37.5° C. to −36° C., which is shown by mass spectrometric analysis to contain 86% of trifluoromethyl isocyanate.

There is also obtained 34 parts of liquid boiling principally at 6° C., which is shown by mass spectrometric analysis to contain bis-trifluoromethylcarbamyl fluoride, i.e.,

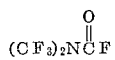

Example VIII

A pressure vessel (capacity, 145 parts of water) lined with a corrosion-resistant material, is charged with 13.9 parts of cyanuric acid and 40 parts of carbonyl difluoride. The mixture is heated under autogenous pressure at 100° C. for 2 hours, 150° C. for 2 hours, 200° C. for 2 hours, 250° C. for 2 hours, and 300° C. for 4 hours. There is obtained 39 parts of volatile product which is stored over sodium fluoride. The product is shown by mass spectrometric analysis to contain 14.7 mole percent of trifluoromethyl isocyanate.

Example IX

A mixture of 30 parts of perfluorobutyronitrile, 30 parts of carbonyl difluoride and 10 parts of hydrogen fluoride is heated under autogenous pressure at 300° C. for 3 hours and 350° C. for 12 hours. Volatile material from the reaction mixture is fractionally distilled to give 1.6 parts of product boiling at 46–50° C. This product is identified as perfluorobutyl isocyanate by infrared spectroscopy. There is also obtained 4 parts of a non-volatile liquid residue, which is indicated by nmr and infrared analyses to contain the compound $C_4F_9NHCOF$. On standing overnight in a glass vessel, this product turns to a solid which is identified by infrared analysis as $C_3F_7CONH_2$. These results indicate that with HF present, the isocyanate is obtained in part as the HF adduct (cf., Buckley et al., loc. cit.).

Example X

A pressure reactor (capacity, 500 parts of water) containing 31 parts of acetonitrile, 55 parts of carbonyl difluoride and 7 parts of cesium fluoride is heated at 300° C. for 2 hours. There is recovered from the reactor at room temperature 32 parts of volatile product, 20 parts of liquid product, and 31 parts of a dark solid which is not examined further. The volatile product is shown by infrared analysis to contain on a molar basis 70% carbonyl difluoride and 20% carbon dioxide. The liquid product is shown by its nmr spectrum to contain chiefly α,α-(difluoroethyl)carbamyl fluoride

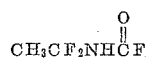

The liquid product is stored over sodium fluoride in a pressure vessel for 4 hours at 25° C. and then for 30 minutes at 40–50° C. to effect dehydrofluorination. There is recovered from this treatment 9 parts of volatile product which is shown by infrared analysis to contain chiefly α,α-difluoroethyl isocyanate, $CH_3CF_2NCO$. The identity of the α,α-difluoroethyl isocyanate is confirmed by comparison with a reference sample of this compound, obtained by reacting acetamide and carbonyl difluoride in the presence of cesium fluoride, isolated by gas chromatography, and identified by mass spectrometric and infrared analyses.

The formation of α,α-(difluoroethyl)carbamyl fluoride indicates that hydrogen fluoride is present in the primary reaction mixture. This is believed to be due to the presence of moisture, which reacts with carbonyl difluoride to form hydrogen fluoride and carbon dioxide. The regeneration of an isocyanate from its HF-adduct is a known reaction (cf., Buckley et al., loc. cit.).

Example XI

A mixture of 21 parts of benzonitrile, 35 parts of carbonyl difluoride and 10 parts of hydrogen fluoride is heated under autogenous pressure at 250° C. for 3 hours and 300° C. for 8 hours. There is obtained 31 parts of a brown liquid which is dissolved in ether, treated with sodium fluoride to remove free hydrogen fluoride, filtered, and concentrated by removal of the ether solvent under reduced pressure. The liquid residue is shown to contain an acyl fluoride group by a test with aniline, with which it reacts vigorously to form a solid product. Analyses which show nmr peaks due to fluorine in the NCOF and $CF_2$ regions, and strong infrared absorption at 1840 and 1860 cm.$^{-1}$ wavelengths indicate the presence of α,α-(difluorobenzyl)carbamyl fluoride, which is the hydrogen fluoride adduct of α,α-difluorobenzyl isocyanate (cf., Buckley et al., loc. cit.).

The polyfluorinated isocyanates obtained by the process of this invention can be represented generically by the formula (5)               $R(CF_2NCO)_n$ where R is fluorine or an aliphatically saturated hydrocarbon or fluorohydrocarbon group as defined under Formula 1, and $n$ is a whole positive number which is limited to 1 when R is fluorine.

The class of compounds represented by Formula 5 is illustrated by the perfluoromethyl isocyanate of Example I, the perfluorobutyl isocyanate of Example V, and the α,α-difluoroethyl isocyanate of Example X. Other examples of this class of compounds, and the compounds from which they are obtained by reaction with carbonyl difluoride, are perfluorododecyl isocyanate from perfluorododecanenitrile, β-hydroperfluoroethyl isocyanate from difluoroacetonitrile, ω-hydroperfluorononyl isocyanate from ω-hydroperfluorononane-nitrile, perfluorotetramethylene diisocyanate from perfluorosuccinonitrile, α,α,α′,α′-tetrafluorohexamethylene diisocyanate from adiponitrile, and t.-butyldifluoromethyl isocyanate from pivalonitrile.

Preferred cyanides for use in the process of this invention are as follows:

$C_nF_{2n+1}CN$, $n=1$ to 11
$H(CF_2)_nCN$, $n=1$ to 11
$C_nH_{2n+1}CN$, $n=1$ to 11
$C_nH_{2n}(CN)_2$, $n=1$ to 10
$C_6H_5CN$
XCN (where X=F, Cl, and Br)
NaCN
KCN
NaOCN
KOCN
NaSCN
KSCN The process for obtaining useful polyfluorinated isocyanates by the reaction of carbonyl difluoride with selected compounds containing carbon-nitrogen multiple bonds in accordance with the foregoing description and examples is more practical than methods which have been used in the past for preparing these isocyanates. For instance, the previous method for preparing perfluoroalkyl isocyanates by the thermal rearrangement of perfluoroalkyl azides involves serious explosion hazards [cf., Husted and Ahlbrecht, J. Am. Chem. Soc. 75, 1606 (1953)]. As another instance, the method based on the reaction of perfluorocarbonamides with sodium hypobromite may proceed in a manner which forms polyfluorinated alkanes instead of isocyanates (cf., Husted et al., loc. cit.). In particular, the preparation of trifluoromethyl isocyanate by the process of this invention utilizes starting materials, e.g., carbonyl difluoride and cyanogen halides or cyanuric acid or alkali cyanides, cyanates, etc., which are more readily available than the starting materials required by the previous methods.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. In a process of preparing fluorinated organic compounds, the step of heating to a temperature of at least 200° C. under substantially anhydrous conditions a mixture of carbonyl difluoride and at least one compound of the formula $$A(CN)_n$$

where A is selected from the group consisting M, halogen, hydroxyl, $-[(O)_n-M]$, $-[(S)_n-M]$, aliphatically saturated hydrocarbon of 1–11 carbons, and aliphatically saturated fluorohydrocarbon of 1–11 carbons, and $n$ is the valence of A and is a positive whole number ranging from 1 to 4, M being a member of the class consisting of an alkali metal and an alkaline earth metal.

2. The process of claim 1 wherein the temperature is between 225° C. and 1000° C. and the molar ratio of $A(CN)_n$ to carbonyl difluoride is between about 0.25:1 and 4:1.

3. The process of claim 1 wherein the temperature is between 200° C. and 1200° C. and the molar ratio of $A(CN)_n$ to carbonyl difluoride is 0.1:1 to 10:1.

4. The process of claim 1 wherein said heating is conducted in the presence of at least one catalyst selected from the group consisting of alkali metal fluorides and hydrogen fluoride.

5. In a process for preparing trifluoromethyl isocyanate, the step of heating to a temperature of at least 200° C. under substantially anhydrous conditions a mixture of carbonyl difluoride and at least one alkali metal cyanide.

6. In a process for preparing trifluoromethyl isocyanate, the step of heating to a temperature of at least 200° C. under substantially anhydrous conditions a mixture of carbonyl difluoride and at least one alkali metal cyanate.

7. In a process for preparing trifluoromethyl isocyanate, the step of heating to a temperature of at least 200° C. under substantially anhydrous conditions a mixture of carbonyl difluoride and at least one alkali metal thiocyanate.

8. In a process for preparing trifluoromethyl isocyanate, the step of heating to a temperature of at least 200° C. under substantially anhydrous conditions a mixture of carbonyl difluoride and at least one cyanogen halide.

9. In a process of preparing a compound of the formula $R(CF_2NCO)_n$, wherein R is an aliphatically saturated hydrocarbon group of 1–11 carbons and $n$ is a positive whole number ranging from 1 to 4, the step of heating a reaction mixture of carbonyl difluoride and $R(CN)_n$ to a temperature of at least 200° C. under substantially anhydrous conditions.

10. In a process of preparing a compound of the formula $R(CF_2NCO)_n$, wherein R is an aliphatically saturated fluorohydrocarbon group of 1–11 carbons and $n$ is a positive whole number ranging from 1 to 4, the step of heating a reaction mixture of carbonyl difluoride and $R(CN)_n$ to a temperature of at least 200° C. under substantially anhydrous conditions.

11. The process of claim 10 wherein R is perfluoroalkyl of 1–11 carbons and $n$ is 1.

12. The process of claim 10 wherein R is ω-hydroperfluoroalkyl of 1–11 carbons and $n$ is 1.

13. In a process of preparing trifluoromethyl isocyanate, the step of heating a mixture of carbonyl difluoride and at least one alkaline earth metal cyanide to a temperature of at least 200° C. under substantially anhydrous conditions.

14. In the process of preparing perfluorobutyl isocyanate, the step of heating a mixture of carbonyl difluoride and perfluorobutyronitrile to a temperature of at least 200° C. under substantially anhydrous conditions.

15. In a process of preparing trifluoromethyl isocyanate, the step of heating a mixture of carbonyl difluoride and at least one alkaline earth metal thiocyanate to a temperature of at least 200° C. under substantially anhydrous conditions.

References Cited in the file of this patent

UNITED STATES PATENTS 2,617,817    Ahlbrecht et al. _____ Nov. 11, 1952

OTHER REFERENCES

Kellogg et al.: "J.A.C.S.," volume 70, pages 3986–90, 1948.